US011104306B2

(12) United States Patent
Auer et al.

(10) Patent No.: US 11,104,306 B2
(45) Date of Patent: Aug. 31, 2021

(54) METHOD AND SYSTEM FOR TREATING THE SURFACE OF A VEHICLE

(71) Applicant: WASHTEC HOLDING GMBH, Augsburg (DE)

(72) Inventors: Robert Auer, Stadtbergen (DE); Ferdinand Conrad, Augsburg (DE)

(73) Assignee: WASHTEC HOLDING GMBH, Augsburg (DE)

( * ) Notice: Subject to any disclaimer, the term of this patent is extended or adjusted under 35 U.S.C. 154(b) by 194 days.

(21) Appl. No.: 16/487,925

(22) PCT Filed: Feb. 20, 2018

(86) PCT No.: PCT/EP2018/054120
§ 371 (c)(1),
(2) Date: Aug. 22, 2019

(87) PCT Pub. No.: WO2018/153845
PCT Pub. Date: Aug. 30, 2018

(65) Prior Publication Data
US 2020/0047721 A1    Feb. 13, 2020

(30) Foreign Application Priority Data

Feb. 24, 2017  (DE) .................... 10 2017 103 841.8

(51) Int. Cl.
*B60S 3/06*    (2006.01)
(52) U.S. Cl.
CPC ...................... *B60S 3/06* (2013.01)
(58) Field of Classification Search
CPC ...................................... B60S 3/06
See application file for complete search history.

(56) References Cited

U.S. PATENT DOCUMENTS 4,039,014 A * 8/1977 Sellars .................. B60S 3/06
                                                    15/53.3
2007/0151054 A1* 7/2007 MacNeil ............. B60S 3/066
                                                    15/53.2

FOREIGN PATENT DOCUMENTS

EP          1795408 A2    6/2007
JP          2005186854 A  7/2005
WO          2004/089708 A2 10/2004

OTHER PUBLICATIONS

International Preliminary Report dated Aug. 27, 2019 with Written Opinion for PCT/EP2018/54120 filed Feb. 20, 2018 (English translation).

(Continued)

*Primary Examiner* — Randall E Chin
(74) *Attorney, Agent, or Firm* — Paul D. Bianco; Gary S. Winer; Fleit Intellectual Property Law

(57) ABSTRACT

A method for treating the surface of a vehicle by means of at least one rotating treatment brush. The treatment brush comprises treatment elements, the surfaces of which are brought into frictional contact with the vehicle surface during the treatment. According to the method, a reference measurement is carried out, in which the treatment brush is set in rotation and is moved into a defined position relative to a reference element, such that the surfaces of the handling elements are brought into frictional contact with the surface of the reference element, and in this case the value of the frictional force is measured directly or indirectly. During the treatment of the vehicle surface, the treatment brush is controlled as a function of the value of the frictional force measured during the reference measurement. A system for treating the surface of a vehicle by means of which this method can be carried out.

15 Claims, 1 Drawing Sheet

(56) References Cited

OTHER PUBLICATIONS

International Search Report dated May 31, 2018 for PCT/EP2018/54120 filed Feb. 20, 2018.
Written Opinion for PCT/EP2018/54120 filed Feb. 20, 2018.

* cited by examiner

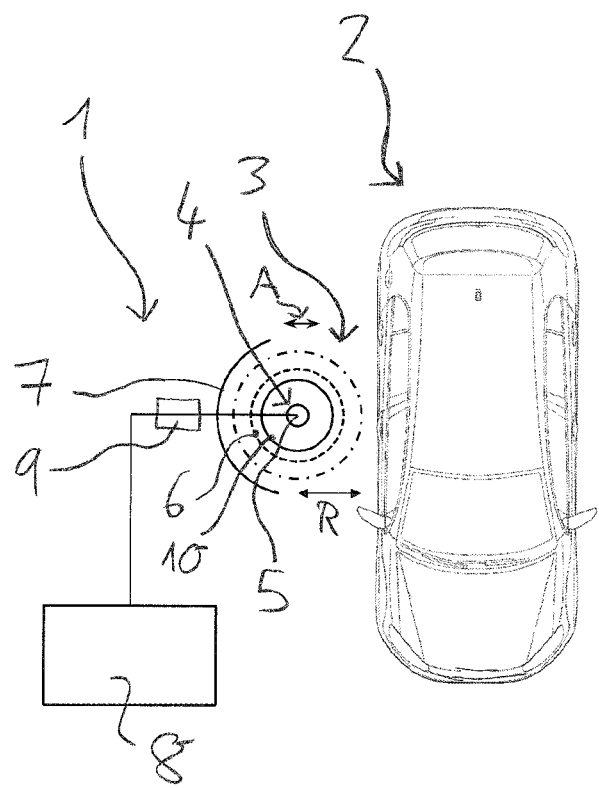

METHOD AND SYSTEM FOR TREATING THE SURFACE OF A VEHICLE

FIELD OF THE INVENTION

The present invention relates to a method for treating the surface of a vehicle, wherein a vehicle surface is treated by means of at least one rotating washing brush, said washing brush comprising treatment elements, the surfaces of which are brought into frictional contact with the vehicle surface during the treatment. The present invention also relates to a system for treating the surface of a vehicle by means of a washing brush which is pivotably mounted about a rotary shaft and which comprises a motor connected to the rotary shaft and treatment elements for frictional contact with the vehicle surface. The system for treating the surface of a vehicle is, in particular, a car wash system.

BACKGROUND OF THE INVENTION

During operation of a car wash system, the problem arises that moving parts of the system are subjected to changes due to use, aging, or wear. To ensure a satisfactory treatment result or, more specifically, a satisfactory washing result over a long period of time during the operation of the car wash system, these changes must be taken into account in the control of the car wash system.

WO 2004/089708 A2 addresses the problem that after a certain time, moving parts inside the motor which drives the washing brush deform. Consequently, the motor will perform less efficiently and will have a higher power input. To solve this problem, it is proposed that prior to starting the washing operation, the washing brush be run at idle and the power input at idle be determined. Based on this power input at idle, the contact pressure of the brush against the surface of the vehicle is determined by means of an analysis of the motor power input.

EP 1 795 408 B1 describes a treatment system for vehicles having a deliverable rotating treatment brush with an electric drive motor for the rotary drive of the treatment brush. The drive motor of the treatment brush is a controllable AC motor with a frequency converter, wherein the frequency converter has an integrated measuring mechanism for the motor current. Using a delivery mechanism, the treatment brush is moved in the direction of the surface that is to be treated. A control unit can be used for the torque-dependent delivery of the treatment brushes, while processing the measuring signals of the measuring mechanism of the motor current of the brush drives. The motor current represents the torque of the drive motor, which in turn is a reference for the immersion depth or the contact pressure of the treatment brush. The driving torque and the immersion depth are controlled and regulated, respectively, to a preset value and kept substantially constant by the control unit.

The methods and treatment systems described in the state of the art have the drawback that changes in the mechanical parameters of the treatment elements of the treatment brush are not adequately taken into account. For example, once the bending rigidity, thickness, or mounting density of the treatment elements of the treatment brush has been reduced as a result of the long-term use of the treatment brush, the frictional force acting between the rotating treatment brush and the vehicle surface to be treated decreases. This leads to a lower power input of the motor. In this case, the distance between the brush shaft and the vehicle surface to be treated decreases until the predefined value for the power input is reached. In cases in which the distance between the brush shaft and the vehicle surface to be treated is not to be changed, an alternative is to increase the speed of the treatment brush so as to again reach a predefined value for the power input of the motor. If, however, none of these adjustments is made, the treatment results will soon no longer be satisfactory. On the other hand, on excessively close contact with the vehicle or at excessively high speeds of the treatment brush, damage to the vehicle components, e.g., external mirrors or windshield wipers, may occur.

SUMMARY OF THE INVENTION

Thus, one aspect of the present invention is relates to a method and a system of the type mentioned above, which ensure a satisfactory treatment result for the surface of a vehicle even if the mechanical parameters of the treatment elements have changed, for example, as a result of use, aging, or wear.

Further advantageous embodiments and refinements are also disclosed.

The method according to the present invention provides for a vehicle surface to be treated by means of at least one rotating treatment brush, wherein the treatment brush comprises treatment elements, the surfaces of which are brought in frictional contact with the vehicle surface during the treatment. This method provides for a reference measurement to be carried out, during which the treatment brush is set in rotation and is moved into a defined position relative to a reference element so that the surface of the treatment elements is brought in frictional contact with the surface of the reference elements, and the value of the frictional force is measured directly or indirectly. During the treatment of the vehicle surface, the treatment brush is regulated based on the value of the frictional force that was measured during the reference measurement.

An advantage of the method according to the present invention is that the adjustment of the regulation of the treatment brush during the treatment of the vehicle surface can be adjusted to absolute changes in the material of the treatment elements. Thus, the method according to the present invention makes it possible to ensure that the treatment result remains satisfactory over a long period of time, even if the mechanical parameters of the treatment elements change, for example, as a result of use, aging, or wear. In methods of the prior art, in which the power input of the motor, for example, is compared to a reference value, only relative fluctuations of the drive unit can be compensated for at idle.

Since the method according to the invention provides for the reference measurement to be carried out at a known position of the treatment brush relative to the reference element, the value of the frictional force, which during the rotation of the treatment brush acts between the treatment elements and the reference element, is not dependent on any differences in the distance of the treatment brush from the reference element. Thus, the treatment brush has a defined immersion depth relative to the reference element. Since the reference measurement is carried out by means of a reference element, the position and geometry of which are known, any changes in the mechanical parameters of the treatment elements can be reproducibly determined. Such a reproducible determination is not possible, for example, by measuring the power input of the motor for the treatment brush while the treatment elements of this treatment brush are rubbing against the vehicle surface, since the precise position of the vehicle surface relative to the treatment brush is not known with sufficient accuracy. Even when the power input is measured while the treatment brush is at idle, changes in the mechanical parameters of the treatment elements cannot be determined.

According to one embodiment of the method described by this invention, during the reference measurement, the treatment brush is first set in rotation and then moved into the defined position relative to the reference element. While the treatment brush is moving in the direction of the reference element, the values of the frictional force can be directly or indirectly determined as a function of the distance of the treatment brush from the reference element, i.e., the immersion depth. While the treatment brush is moving in the direction of the reference element, the speed remains constant. Advantageously, this allows the values determined for the frictional force at lower depths of immersion also to be used to regulate the treatment brush during the treatment of the vehicle surface. Alternatively, however, it would also be possible first to move the treatment brush into the defined position relative to the reference element and then to set it in rotation.

The value of the frictional force during the reference measurement can be measured, for example, as a function of the power input that is required to keep the treatment brush in rotation at a certain speed. For example, it is possible to determine the power input of the motor that sets the treatment brush in rotation. In this case, the frictional force is measured indirectly. However, the frictional force can also be measured, directly or indirectly, by means of other methods known in the art.

According to one embodiment of the method described by this invention, during the treatment of the vehicle surface, the power input of the treatment brushes is regulated as a function of the measured value of the frictional force. Thus, in contrast to method used in the prior art, the power input of the treatment brush is not regulated to a fixed, predefined value, but to a value which results from the reference measurement which is performed by means of the reference element.

The setpoint value of the power input of the treatment brush during the treatment of the vehicle surface at a specific immersion depth specifically corresponds to the measured value of the power input of the treatment brush at this immersion depth during the reference measurement. This embodiment is used especially if the surface area with which the treatment brush is in contact during the reference measurement is of approximately the same size as the surface area with which the treatment brush is in contact during the treatment of the vehicle surface. Advantageously, this allows taking into account absolute changes in the material of the treatment elements so that a satisfactory treatment result is obtained over a long period of time.

The immersion depth is the difference between the radius of the treatment brush at the speed at which the treatment brush is set in rotation during operation and the distance of the axis of rotation of the treatment brush from the surface to be treated. Thus, the immersion depth indicates to what extent the treatment elements are rubbing against the surface to be treated.

If, in an embodiment of the method according to the present invention, a lateral surface of the vehicle is to be treated, the height of the vehicle in particular is measured, and during the treatment of the vehicle surface, the setpoint value of the power input of the treatment brush at a specific immersion depth of the treatment brush is based on the value of the power input of the treatment brush measured at this immersion depth during the reference measurement and based on the measured height of the vehicle. Thus, the surface area with which with the treatment brush is in contact during the reference measurement may be larger or smaller than the surface area with which the treatment brush is in contact during the treatment of the lateral surface of the vehicle. Because of the different sizes of the surface areas, a different power input of the treatment brush results. In this embodiment, this can be compensated for by taking into account the height, and thus the size of the surface area, during the treatment of the lateral surface of the vehicle. The height of the vehicle can be determined, for example, by means of a roof brush. A measuring mechanism of such a roof brush determines the height of the roof brush at a specific longitudinal position of the vehicle during treatment with the brush. This height corresponds to the height of the vehicle with a certain offset. The profile pattern of the height of the roof brush across the vehicle is stored in the control unit of the car wash system and is thus available as a two-dimensional vehicle contour. This vehicle contour can subsequently be taken into account during the treatment of the lateral surface of the vehicle. This also allows taking into account in which position along the longitudinal direction the treatment brush is located. In this case, the setpoint value of the power input can be based on the height of the vehicle in the position of the treatment brush in the longitudinal direction of the vehicle.

According to another embodiment of the method according to the present invention, a surface area of the roof of the vehicle is treated. Since in this case, the variations in the width of the vehicle are not as pronounced, the setpoint value of the power input of the treatment brush during the treatment of the vehicle can correspond to the value of the power input of the treatment brush measured during the reference measurement, or it can be calculated from this value regardless of the geometry of the vehicle.

According to another embodiment of the method described by this invention, during the treatment of the vehicle surface up to the point at which the setpoint value of the power input of the treatment brush at the specific immersion depth is reached, the power input is determined as a function of the values of the power input of the treatment brush measured up to this immersion depth during the reference measurement. Thus, the curve plotted during the reference measurement shows the power input as a function of the immersion depth. This curve is subsequently used during the treatment of the vehicle surface to regulate the power input until a specific immersion depth is reached; and when this specific immersion depth is reached, the setpoint value for the power input for this immersion depth is reached. This ensures that the setpoint value for the power input is very quickly and precisely reached and that, in addition, the power input at lower depths of immersion is also regulated as a function of the reference measurement.

According to another embodiment of the method described by this invention, it is determined, based on the values of the frictional force measured during the movement of the treatment brush in the direction of the reference element, whether the treatment elements of the treatment brush are to be replaced. For example, if the curve which describes the power input as a function of the immersion depth during the reference measurement is very flat, i.e., if the power input does not increase at all or only very slightly as the immersion depth increases more and more, this indicates that the treatment elements are worn out and should be replaced. In this case, the method according to the present invention may provide an indication to signal that the treatment elements should be replaced.

If the reference measurement performed in the method according to the present invention indicates, for example, that based on wear phenomena of the treatment brush, the frictional force between the treatment elements and the reference surface is reduced, this change can be compensated for during the treatment of the vehicle surface by increasing the speed of the treatment brush and thus the power input. This also ensures that the treatment result will be satisfactory over an extended period of time. At the same time, however, it must be ensured that the speed does not exceed a defined limit value at which damage to the vehicle can occur.

According to another embodiment of the method described by this invention, the reference measurement is carried out cyclically. In this case, during the treatment of the vehicle surface, the treatment brush is regulated based on the value of the frictional force measured during the last reference measurement. For example, reference measurements can be carried out at specific intervals of time or prior to each treatment of a vehicle surface. The time interval for the cyclically performed reference measurements can be determined based on experimental values of aging and wear of the treatment elements. This ensures that the reference measurement does not unnecessarily frequently delay the treatment of the vehicle surface, but at the same time allows changes in the mechanical parameters of the treatment elements to be considered adequately during the treatment of the vehicle surface.

According to yet another embodiment of the method described by this invention, the reference measurement is carried out after the replacement of the treatment elements. During the treatment of the vehicle surface, the treatment brush is regulated based on the value of frictional force measured during the last reference measurement. If the treatment elements are regenerated or replaced with different treatment elements, the value resulting for the frictional force acting between the treatment elements of the treatment brush and the vehicle surface to be treated will be different. Carrying out a reference measurement after a replacement of the treatment elements ensures that the treatment brush is controlled so as to lead to a satisfactory treatment result.

According to yet another embodiment of the method described by this invention, separate reference measurements for opposite directions of rotation during the rotation of the treatment brush are carried out. In this case, during the treatment of the vehicle surface, the treatment brush is regulated based on the value of the frictional force that was measured during the last reference measurement for direction of rotation in which the treatment brush was rotated during the treatment of the vehicle surface. Especially when new treatment brushes are used, because of the way the treatment brush is mounted, the treatment elements may prefer a different direction than the direction of rotation of the treatment brush. The separately performed reference measurements for opposite directions of rotation allow this preferred direction to be taken into account for the subsequent treatment of the vehicle surface. As a rule, over time the values measured for the frictional force in the separate reference measurements even out. If the values measured fall below a predetermined tolerance value, the method can be carried out in such a way that the separate reference measurements for opposite directions of rotation are not performed and that only one reference measurement for a predefined direction of rotation is performed.

For example, during the reference measurement, the treatment brush can be moved in the direction of the reference element until the treatment brush has reached a defined immersion depth relative to the reference element. Since in most cases the treatment brush is able to perform a delivery movement toward the vehicle surface, this movement can be utilized to deliver the treatment brush to the reference element. The advantage is that the reference element can be fixedly mounted.

The system for treating the surface of a vehicle according to the present invention comprises a treatment brush which is pivotally mounted about a rotary shaft and which comprises a motor, which is connected to the rotary shaft, and treatment elements for frictional contact with the vehicle surface. The system further comprises a reference element for carrying out a reference measurement and a control unit which is connected to the motor and by means of which, for the purpose of carrying out the reference measurement, the treatment brush can be set in rotation and moved into a defined position relative to the reference element so that the surfaces of the treatment elements are brought into frictional contact with the surface of the reference element, and at the same time the value of a frictional force is measured directly or indirectly. During the treatment of the vehicle surfaces, the treatment brush can then be regulated by means of the control unit based on the value of the frictional force measured during the reference measurement. In addition, during the reference measurement, the values of the frictional force can be measured directly or indirectly while the rotating treatment brush is moving in the direction of the reference element. In that case, the treatment of the vehicle surfaces can also be carried out by means of the control unit during the movement in the direction of the defined position relative to the reference element based on the values of the frictional force measured during the reference measurement.

The treatment system is specifically designed to carry out the method described above. Thus, it also has the same advantages as the method according to the present invention.

The treatment system is particularly a car wash system for cleaning the surface of a vehicle. The car wash system can be a gantry-type car wash system, a car wash system for commercial vehicles or a conveyor tunnel car wash. The treatment brush can be a side brush or a roof brush.

According to one embodiment of the system described by this invention, this system comprises a brush spray guard which is disposed adjacent to the treatment brush. This brush spray guard functions as the reference element. Thus, in this case, there is no need to provide a separate reference element. The system is designed in such a way that by means of the control unit, the treatment brush can be moved in the direction of the brush spray guard so as to carry out a reference measurement. To this end, the brush spray guard is suitably mounted so as to be sufficiently stable.

According to an refinement of the system described by the present invention, the rotary shaft of the treatment brush is mounted so as to allow the treatment brush to move in a direction perpendicular to the rotary shaft, with the treatment brush being able to move both in the direction of the vehicle and in the direction of the reference element, for example, the brush spray guard.

The surface of the reference element in particular has a defined surface roughness. In addition, the surface of the reference element is designed to ensure that the surface roughness does not change during the course of the normal life of the system when reference measurements are carried out by means of the reference element. The surface of the reference element in particular resembles the standard surface of a vehicle, especially with respect to the coefficient of friction between the surface and the treatment elements of the treatment brush.

BRIEF DESCRIPTION OF THE DRAWINGS

The invention will be described below based on an embodiment example with reference to the drawing.

The FIGURE shows a diagrammatic representation of the main elements of an embodiment example of the treatment system according to the invention.

DETAILED DESCRIPTION OF THE INVENTION

The embodiment example described below refers to a car wash system 1 for a vehicle 2. This system can be a conveyor tunnel car wash or a gantry-type car wash system.

The car wash system 1 comprises a washing brush 3 which serves as a treatment brush and which is pivotally mounted about a rotary shaft 5. In the embodiment example shown, the washing brush 3 is a washing brush for the side of the car. The rotary shaft 5 is connected to a motor 4 which serves as the drive motor for the rotational movement of the washing brush 3. Radially mounted on the outside of the washing brush 3 are treatment elements 6 known in the art which are attached to a carrier element 10. In FIG. 1, with the washing brush 3 at rest, the circumference formed by the treatment elements 6 is represented by a broken line. During rotation of the washing brush 3, the treatment elements 6 are driven outwardly by the centrifugal force. In the FIGURE, with the washing brush 3 in operation, the circumference formed by the rotating treatment elements 6 is represented by a dash-dotted line. In this case, the radius is designated by R. In this context, it should be noted that the FIGURE is not drawn to scale.

Disposed on the side of the washing brush 3 facing away from the vehicle 2 is a brush spray guard 7. The brush spray guard 7 is designed as a shield curved in the shape of a bowl, with the curve being concentric with respect to the washing brush 3.

The washing brush 3 is connected to a delivery unit 9. The delivery unit 9 makes it possible for the washing brush 3 to move back and forth 3 in the direction of arrow A. More specifically, the washing brush can be moved in the direction of the surface of the vehicle 2. Both this movement and the rotation of the washing brush 3 are respectively controlled and regulated by a control unit 8. In particular, the washing brush 3 can be moved up to a specific immersion depth toward the surface of the vehicle 2. The immersion depth indicates how far the surface of the vehicle is immersed in the treatment elements 6 which, as a result of the rotation, project radially outwardly. The immersion depth is here defined as the difference between the radius R and the distance of the axis of the washing brush 3 from the vehicle surface.

Such a washing brush 3 is known in the art and will therefore not be described in greater detail.

In the car wash system 1 according to the present invention, the brush spray guard 7 is designed to serve as a reference element 7. However, in other embodiment examples, the reference element 7 might be a separate part. Using the reference element 7, reference measurement is carried out as described in greater detail below.

Furthermore, the control unit 8 is designed to move the washing brush 3 in a direction A perpendicular to the rotary shaft 4 toward the reference element 7 until the distance of the axis of the washing brush 3 from the reference element 7 has reached a defined value that is stored in the control unit 8. For example, by means of the delivery unit 9, the rotary shaft 5 can be moved in a direction perpendicular to the rotary shaft 5. The control unit 8 is designed to set the washing brush 3 in rotation and to move it into a defined position. In that case, the distance of the washing brush 3 from the reference element is such that during the rotation of the washing brush 3, the treatment elements 6 are in frictional contact with the surface of the reference element 7. Thus, the position of the washing brush 3 relative to the reference element 7 corresponds to a specific immersion depth. The control unit 8 actuates the washing brush 3 in such a way that the speed corresponds to a defined value that is stored in the control unit 8. This value corresponds to a customary speed as is usually also actuated during the treatment of the vehicle surface 2. The control unit 8 is designed to measure the power input required to keep the washing brush 3 in rotation during this rotating state of the washing brush 3. In this manner, the power input of the motor 4 is determined. To this end, it is possible, for example, to measure the current consumption, the voltage, and the phase angle of the motor 4, from which values the power input is subsequently calculated. The control unit 8 is designed to store the values of this power input from the reference measurement together with any metadata, such as the immersion depth, the time of the reference measurement and the type of treatment elements 6 used.

For the reference measurement, the brush spray guard 7 which serves as the reference element 7 has a surface facing the washing brush 3, which surface has a surface roughness similar to the surface roughness of a vehicle surface. Furthermore, this surface is sufficiently stable so that the surface roughness does not change even if a large number of reference measurements are carried out.

Next, an embodiment example of the method according to the present invention will be described:

During the first start-up operation of the washing brush 3, initially two reference measurements are carried out. To this end, the washing brush 3 is set in rotation by means of the motor 4 and moved by means of the delivery unit 9 in the direction of the reference element 7 until the axis of the washing brush 3 has reached a defined position and thus a specific distance from the reference element 7. This distance corresponds to a specific immersion depth of the washing brush 3 relative to the reference element 7. While the washing brush 3 is moving in the direction of the reference element 7, it rotates at a fixed speed in a first direction of rotation. The speed of the washing brush 3 corresponds to the speed that is also used when the vehicle 2 is washed with the washing brush 3. During rotation of the washing brush 3, the treatment elements 6 are in frictional contact with the surface of the reference element 7. In contrast to a rotation of the washing brush 3 at idle, i.e., without surface contact, the power input of the motor 4 increases when the treatment elements are in frictional contact with the surface of the reference element 7. The power input of the motor 4 during the movement of the washing brush 3 in the direction of the reference element and in the end position of the washing brush 3 at the defined immersion depth is measured by means of the control unit 8 and stored in a storage device as a function of the immersion depth together with the time of the reference measurement and the direction of rotation and, optionally, the speed during the reference measurement. Thus, a curve is plotted which shows the power input of the motor 4 as a function of the immersion depth.

Subsequently, a reference measurement is carried out, but with the washing brush 3 rotating in an opposite direction of rotation. In this case again, the value of the power input of the motor 4 is stored as a function of the immersion depth together with the time of the reference measurement and the direction of rotation and, where appropriate, the speed during the reference measurement. During the first start-up operation of the washing brush, the power input of the motor 4 during the reference measurement may depend on the direction of rotation, since, because of the way it was previously mounted, the washing brush 3 may rotate in a certain preferred direction.

After completion of the reference measurement, the washing brush 3 is moved by means of the delivery unit 9 back into the rest position shown in the FIGURE. If thereafter a vehicle 2 is to be cleaned in the car wash system 1 by means of the washing brush 3, the washing brush 3 is set in rotation in a manner known in the art and moved by means of the delivery unit 9 in the direction of the surface of the vehicle 2. The maximum immersion depth of the washing brush 3 relative to the surface of the vehicle 2 is set so that it corresponds to the immersion depth in the end position during the previously performed reference measurement. This causes the surfaces of the treatment elements 6 to rub against the vehicle surface in order to clean it. By means of the control unit 8, the power input of the motor 4 is regulated as follows:

In a process step which precedes the cleaning with the washing brush 3, the height of the vehicle 2 to be cleaned or, more specifically, the height contour of this vehicle 2 is measured. This step is optional and can be omitted if the height of the reference element 7 approximately corresponds to the height of the vehicle 2. In that case, the setpoint value of the power input of the motor 4 for the maximum immersion depth of the washing brush 3 depends on the power input last stored during the reference measurement for the same direction of rotation at the same immersion depth. For example, the setpoint value of the power input during the treatment of the vehicle surface may depend upon the power input last stored during the reference measurement for the same direction of rotation at the same immersion depth and upon the height the vehicle 2 or, more specifically, upon the height of the vehicle 2 in the current position of the washing brush 3 in the longitudinal direction of the vehicle 2. If the reference element 7 has approximately the same height as the vehicle 2, the setpoint value of the power input during the treatment of the vehicle surface may correspond to the power input last stored during the reference measurement for the same direction of rotation at the same immersion depth.

While the washing brush 3 is approaching the maximum immersion depth, the power input of the motor 4 at an immersion depth is regulated as a function of the values of the power input of the washing brush 3 determined during the reference measurement at a corresponding immersion depth. Where appropriate, this power input during the approach can also be determined as a function of the height of the vehicle 2 or, more specifically, as a function of the height of the vehicle 2 in the current position of the washing brush 3 in the longitudinal direction of the vehicle 2. The curve of the power input as a function of the immersion depth during the treatment of the vehicle surface corresponds, in particular, to the curve plotted during the reference measurement.

If, during the washing procedure, the washing brush 3 is rotated in an opposite direction of rotation, the power input of the motor 4 is regulated by means of the control unit 8 in such a way that it depends upon the power input, or corresponds to the power input, last stored during a reference measurement for this direction of rotation, and, optionally, upon the height the vehicle 2 or, more specifically, upon the height of the vehicle 2 in the current position of the washing brush 3 in the longitudinal direction of the vehicle 2.

After completion of the washing procedure, the delivery unit 9 moves the washing brush 3 back into its rest position.

In this manner, additional washing procedures for vehicles 2 are subsequently carried out. After a specific interval of time or after a specific number of washing procedures, two reference measurements for the two directions of rotation are again carried out as described above. If, during the two reference measurements for the opposite directions of rotations, it is found that the power input is independent of the direction of rotation, only one reference measurement for one direction of rotation is carried out during the subsequently following reference measurements. During washing procedures for vehicles 2, the regulation of the washing brush 3 is subsequently controlled independently regardless of the direction of rotation.

During the cyclically performed reference measurements, it may be found that the power input of the motor 4 decreases. The reason for this is that over time the treatment elements 6 wear out and that the number of the treatment elements 6 possibly decreases, for example, because bristles or the like fall out. This decreases the value of the frictional force between the treatment elements 6 and the reference element 7 so that a lower power input of the motor 4 is required to set the washing brush in rotation at a specific immersion depth. Since, during subsequent washing procedures, the power input of the motor 4 is regulated to the value resulting from the last reference measurement, it is possible to compensate for absolute changes in the mechanical parameters of the treatment elements.

If the value of the power input of the motor 4 during the reference measurement has fallen below a limit value, the method may provide for a means for increasing the speed. However, in order to prevent damage to the vehicle, it must be ensured that an upper limit value for the speed is not exceeded. By increasing the speed, the wear of the treatment elements 6 can be compensated for to a limited extent. In that case, the setpoint value for the power input of the motor 4 can be increased by a certain percentage relative to the value measured during the reference measurement in order to take into account the changed speed relative to the speed during the reference measurement.

Finally, a minimum value can be specified for the power input of the motor 4 during the reference measurement. If the power input falls below this minimum value, an indication will be provided to signal that the treatment elements 6 should be replaced. The need for replacing the treatment elements 6 can also be determined based on the curve plotted for the power input as a function of the immersion depth. After each replacement of the treatment elements 6, a reference measurement or two reference measurements for opposite directions of rotations must be carried out as described above.

If the washing brush 3 is a roof brush, the power input of the washing brush 3 can be regulated in a corresponding manner. In that case, the reference element 7 can be a spray guard for the roof brush.

LIST OF REFERENCE CHARACTERS

1 Treatment system
2 Vehicle
3 Treatment brush; washing brush
4 Motor
5 Rotary shaft 6 Treatment elements
7 Brush spray guard; reference element
8 Control unit
9 Delivery unit
10 Carrier element

The invention claimed is:

1. A method for treating the surface of a vehicle, the method comprising:
  providing a rotating treatment brush for treating the vehicle surface, the treatment brush comprising treatment elements, surfaces of which are brought into frictional contact with the vehicle surface during treatment;
  performing a reference measurement in which the treatment brush is set in rotation and moved into a defined position relative to a reference element so that the surfaces of the treatment elements are brought into frictional contact with a surface of the reference element and, at the same time, a value of frictional force is measured directly or indirectly, and
  regulating the treatment brush during the treatment of the vehicle surface based on the value of the frictional force measured during the reference measurement.

2. The method of claim 1, wherein during the reference measurement, the treatment brush is first set in rotation and then moved into the defined position relative to the reference element, with values of the frictional force during the movement of the treatment brush in the direction of the reference element being directly or indirectly determined as a function of the distance of the treatment brush from the reference element.

3. The method of claim 2, wherein based on the values of the frictional force measured during movement of the treatment brush in the direction of the reference element, a determination of whether the treatment elements of the treatment brush should be replaced is made.

4. The method of claim 1, wherein during the reference measurement, the value of the frictional force is measured by a power input needed to keep the treatment brush in rotation at a specific speed.

5. The method of claim 1, wherein during the treatment of the vehicle surface, a power input of the treatment brush is regulated as a function of the value of the frictional force measured.

6. The method of claim 1, wherein a lateral surface of the vehicle is treated, wherein a height of the vehicle is measured, and wherein during the treatment of the vehicle surface, a setpoint value of power input of the treatment brush at a specific immersion depth of the treatment brush used is based on the value of the power input of the treatment brush measured at the immersion depth during the reference measurement and based on the height of the vehicle measured.

7. The method of claim 6, wherein during the treatment of the vehicle surface up to the point at which the setpoint value of the power input of the treatment brush at the specific immersion depth is reached, the power input is determined as a function of the values of the power input of the treatment brush measured up to the immersion depth during the reference measurement.

8. The method of claim 1, wherein the reference measurement is performed cyclically and the treatment brush during the treatment of the vehicle surface is regulated based on the value of the frictional force measured during a previous reference measurement.

9. The method of claim 1, wherein the reference measurement is performed after a replacement of the treatment elements and wherein the treatment brush during the treatment of the vehicle surface is regulated based on the value of the frictional force measured during the last reference measurement.

10. The method of claim 1, wherein separate reference measurements for opposite directions of rotation during the rotation of the treatment brush are carried out, and wherein the treatment brush during the treatment of the vehicle surface is regulated based on the value of the frictional force measured during the last reference measurement for the direction of rotation in which the treatment brush is rotated during the treatment of the vehicle surface.

11. The method of claim 1, wherein during the reference measurement, the treatment brush is moved in the direction of the reference element until the treatment brush has reached a defined immersion depth relative to the reference element.

12. A system for treating a surface of a vehicle with a treatment brush pivotally mounted about a rotary shaft, the treatment brush comprising a motor connected to the rotary shaft and treatment elements for frictional contact with the vehicle surface, the system further comprising
  a reference element for carrying out a reference measurement and
  a control unit coupled to the motor for carrying out the reference measurement, the treatment brush rotatable and moveable into a defined position relative to the reference element so that surfaces of the treatment elements are brought into frictional contact with the surface of the reference element and, at the same time, a value of the frictional force is measured directly or indirectly,
  wherein the treatment brush during the treatment of the vehicle surface is regulated by the control unit based on the value of the frictional force measured during the reference measurement.

13. The system of claim 12, wherein the system further comprises a brush spray guard disposed adjacent to the treatment brush and wherein the brush spray guard functions as the reference element.

14. The system of claim 12, wherein the rotary shaft of the treatment brush is mounted such that the treatment brush is moveable in a direction perpendicular to the rotary shaft, with the treatment brush is moveable both in the direction of the vehicle and in the direction of the reference element.

15. The system of claim 12, wherein the surface of the reference element has a defined surface roughness.

* * * * *